Patented July 28, 1942

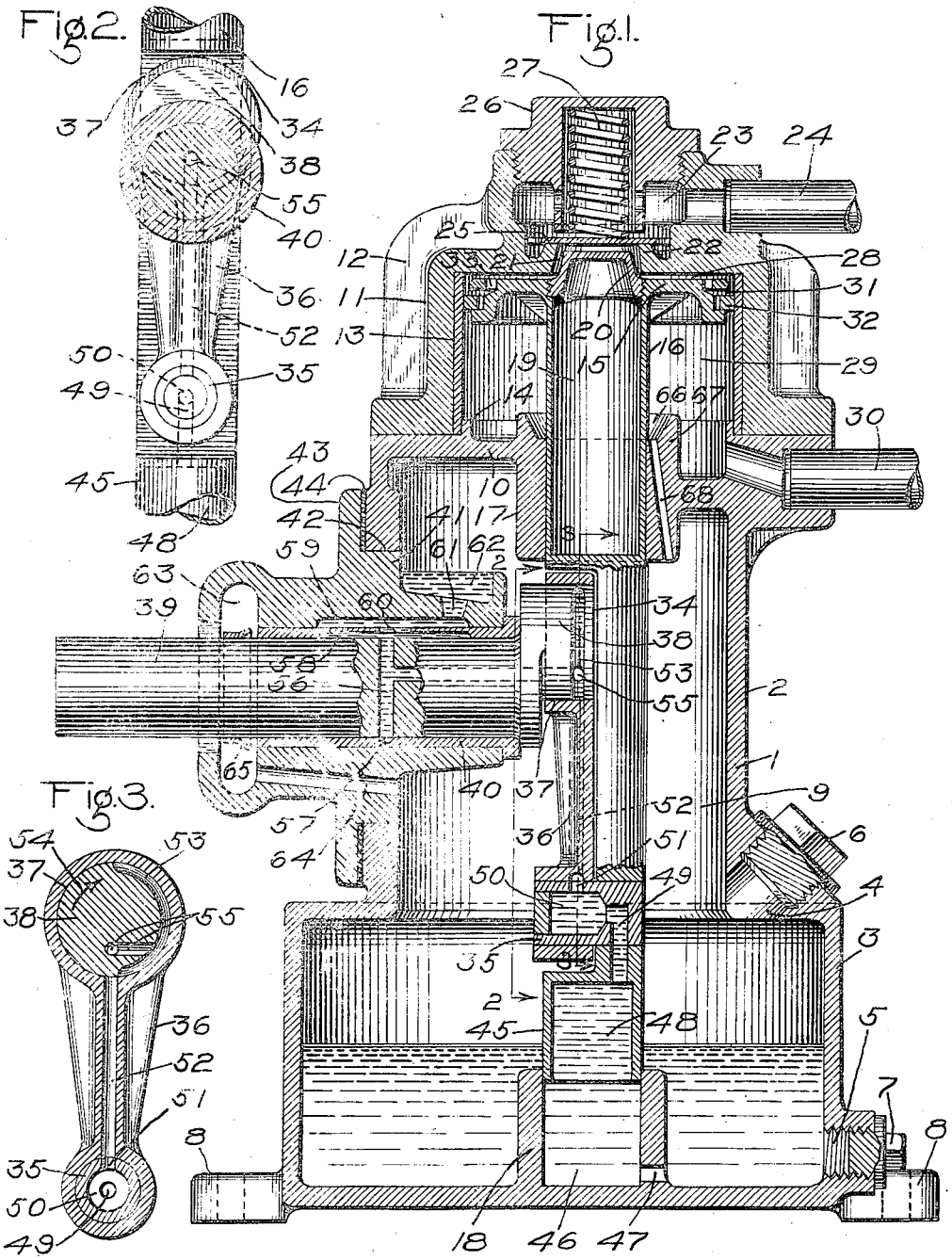

2,290,931

UNITED STATES PATENT OFFICE 2,290,931

FLUID COMPRESSOR

Burton S. Aikman, Wilkinsburg, Pa., assignor to The Westinghouse Air Brake Company, Wilmerding, Pa., a corporation of Pennsylvania Application April 29, 1940, Serial No. 332,176

22 Claims. (Cl. 230—172)

This invention relates to fluid compressors and more particularly to the reciprocating piston type.

One object of the invention is to provide an improved compressor of this type so designed that lubricating oil from the crank case cannot enter the compression chamber of the compressor and thereby become mixed with the air being compressed.

Another object of the invention is to provide an improved fluid compressor involving a minimum of parts which are simple to construct, requiring only little and simple machine work and which are easily assembled and replaceable.

Still another object of the invention is to provide a simple and effective force feed lubricating system for fluid compressors or the like.

Other objects and advantages will be apparent from the following more detailed description of the invention.

In the accompanying drawing: Fig. 1 is a vertical sectional view of a fluid compressor constructed in accordance with the invention; and Figs. 2 and 3 are sectional views taken on the lines 2—2 and 3—3, respectively, in Fig. 1.

Description

As shown in the drawing, the compressor comprises a main body portion 1 consisting of a crank case 2 which is carried by and formed integral with an oil reservoir 3. The reservoir 3 has a passage 4 through which oil is adapted to be supplied to the reservoir and a passage 5 for draining oil from the reservoir 3, plugs 6 and 7, respectively, normally closing said passages. At the bottom of the reservoir 3 there are provided mounting lugs 8 for securing the compressor to a base plate or the like.

The crank case 2 has a chamber 9 open at its lower end directly to the oil reservoir 3 while the upper end of the chamber is closed by a wall 10. A cylinder member 11 provided exteriorly with heat radiating fins 12 is secured to the upper end of the crank case 2 and is provided interiorly with a bore lined with a bushing 13 having self-lubricating characteristics. The crank case 2 is provided with an annular centering rib 14 having a sliding fit in the lower open end of the bushing 13 for centering the cylinder 11 with the crank case 2.

An air compressing or displacement piston 15 is mounted to reciprocate in the bushing 13 and is supported in concentric relation to said bushing by a coaxially arranged and preferably integrally formed stem 16. The stem 16 extends through a suitable bore provided in a boss 17 formed in wall 10 and has its lower end slidably mounted in a bore provided in a boss 18 extending upwardly from the bottom of the oil reservoir 3, the fit between the piston stem and the bosses 17 and 18 being preferably a neat sliding fit.

The upper portion of the piston rod 16 is bored out as indicated by reference numeral 19 for reducing the weight thereof and the open end of this bore is closed by a plug 20 secured in the piston 15. The plug 20 is preferably conical in shape and extends above the pressure face of the piston so as to enter a recess 21 provided within an annular discharge valve seat 22 to thereby minimize clearance space above the piston when in its uppermost position.

The cylinder member 11 has a discharge chamber 23 open to a discharge pipe 24 through which fluid compressed by the piston 15 upon reciprocation thereof is adapted to be conveyed to a storage reservoir or the like. A discharge valve 25, which is preferably of the disk type, is arranged in the discharge chamber 23 for engagement with the seat rib 22, and interposed between said valve and a cap 26 having screw threaded engagement with the cylinder member 11 is a spring 27 for urging the discharge valve against its seat 22.

The piston 15 has at its pressure face a compression chamber 28 open to the recess 21. At the opposite face of the piston is an intake chamber 29 which is open to an intake pipe 30. The piston 15 is of smaller diameter than the inside diameter of bushing 13 and is supported in concentric working relation with the bushing by the bearings of the piston rod 16 in the bosses 17 and 18. The piston has an annular ring groove 31 in which there is provided a piston ring 32 having sliding contact with the interior wall of the bushing 13. The width of the ring groove 31 is greater than that of the ring 32 so that upon movement of the piston 15 in a downwardly direction communication will be established from the intake chamber 29 past the lower face of the ring through clearance space provided between the bottom of the ring groove and the interior surface of the ring to a plurality of ports 33 which open to pressure chamber 28 to thereby permit fluid at atmospheric pressure supplied to chamber 29 to flow to chamber 28. Upon movement of the piston in an upwardly direction, the ring 32 is adapted to engage the lower side of the groove 31 for closing the communication just described to thereby render the piston operable to compress the air in chamber 28 and to force same past the discharge valve 25 to discharge chamber 23.

Within the crank chamber 9 the piston stem 16 is provided in one side with a notch 34 which preferably extends into the rod to the axis thereof. Adjacent the lower end of notch 34 there is provided a wrist pin 35 having one end rigidly secured in the piston stem 16. A connecting rod 36 disposed in the notch 34 in substantial sliding contact with the bottom wall thereof has its lower end rockably journaled on the wrist pin 35. The upper end of the connecting rod 36 is journaled on a bearing 37 provided on a crank arm 38 of a crank shaft 39.

The crank shaft 39 is journaled in a bushing 40 which is carried in a bearing member 41. The bearing member 41 has an annular centering portion 42 having a sliding fit in a bore provided through one side of the crank case 2 and around said centering portion there is provided a flange 43 adapted to be secured to the crank case 2. A gasket 44 is preferably provided between the flange 43 and the crank case 2 for preventing leakage of lubricant from the crank case at this joint.

The lower end of the piston rod 16, designated by reference numeral 45, and the bore in the boss 18 in which said end of the rod is adapted to reciprocate constitute, respectively, a piston and cylinder of a lubricant pump for forcing oil under pressure to certain parts of the compressor which are subject to wear.

Below the end of the rod in the boss 18 is a chamber 46 which is open through an inlet port 47 to the oil reservoir 3 adjacent the bottom thereof. The lower end of the piston stem 16 is bored out for the purpose of reducing weight and this provides a chamber 48 in constant communication with the chamber 46. The chamber 48 is connected by a passage 49 in the piston stem 16 to a chamber 50 in the wrist pin 35, the chamber 50 being relatively large, also to reduce weight of the parts. A port 51 in the wrist pin provides a constantly open communication between chamber 50 and a passage 52 in the connecting rod 36 which leads to the bearing 37 on the crank shaft arm 38. The bearing 37 has an arcuate groove 53 extending substantially half way around the bearing and so arranged as to register with passage 52 in the connecting rod 36 upon downward movement of the compressor piston 15 and to be out of registry with said passage during upward movement of the piston. In order that this groove will function as intended the crank arm 38 must be rotated in the direction indicated by the arrow 54 shown in Fig. 3.

The arcuate groove 53 is in constant communication with an oil conducting passage 55 leading through the crank arm 38 and crank shaft 39 to a passage 56 which extends diametrically through said crank shaft from one side to the other. The passage 56 is in constant communication with an oil groove 57 extending around the interior of the bushing 40 and opening at the top of the bushing to an oil groove 58 extending longitudinally of the bushing.

The bearing member 41 has above the bushing 40 an oil slot 59 open to the groove 58 through a port 60 and also connected by an aperture 61 to an oil pocket 62 provided in the uppermost portion of bearing member 41 within the crank case chamber 9.

In the outer end of the bearing member 41 there is provided an annular space 63 encircling the crank shaft 39 and open at its lowermost portion through a bore 64 to the crank case chamber 9. A deflector ring 65 is secured to the crank shaft 39 within the space 63 and is adapted upon rotation of said crank shaft to throw oil, which may creep through the bushing 40 along the crank shaft on to said ring, into the chamber 63 from whence it will drain back through the bore 64 to the crank case 9 and thereby to the oil reservoir 3.

An annular oil receiving and collecting space or recess 66 is provided around the piston rod 16 in chamber 29 within an upstanding rib 67 projecting from the crank case end wall 10. This recess is open to the crank case chamber 9 through a drain port 68. The rib 67 is so arranged with respect to the communication between chamber 29 and intake pipe 30 as to prevent air flowing into and out of said chamber upon reciprocation of piston 15 from coming into contact with oil which may gather in the recess 66.

*Operation*

In operation, it will apparent that when the crank shaft 39 is rotated by any suitable means (not shown) the connecting rod 36 will be caused to operate to effect reciprocation of the piston rod 16 and thereby of the piston 15 for alternately drawing air from the atmosphere through the intake pipe 30 to chamber 28 and then compressing said air past the discharge valve 25 and through chamber 23 to pipe 24 which may lead to a storage reservoir or the like.

As the compressor is thus operated the lubricating pump piston 45 at the lower end of piston rod 16 will be caused to reciprocate in chamber 46. During movement of the piston 45 out of chamber 46 upon the intake stroke of the piston the arcuate groove 53 in the crank arm 38 will be out of communication with oil passage 52 thus ensuring that oil for filling the chambers 46 and 48 will be drawn from reservoir 3 through port 47, the closing of said communication preventing back flow of oil to said chambers from the lubricant conveying communications in the piston rod, connecting rod and crank shaft. Thus at the end of the intake stroke of the lubricant pump piston the chambers 46 and 48 and the oil conveying communications just mentioned will all be filled with oil.

The intake stroke of the lubricant pump piston 45 is completed substantially at the upper dead center position of the crank arm 38 and at the time said arm passes over dead center the groove 53 in the arm moves into registry with the oil passage 52 in the connecting rod 36. Movement of the lubricant pump piston 45 downwardly into chamber 46 is then adapted to displace oil from said chamber through chamber 48, passage 49, chamber 50 in the wrist pin 35, passage 52 in the connecting rod, arcuate groove 53 and passages 55 and 56 in the crank shaft to oil grooves 57 and 58 in bushing 40 to thereby lubricate the bearings of the connecting rod and crank shaft. After these chambers and passages are filled with oil any further oil displaced by piston 45 during the remainder of its stroke escapes from the crank shaft bearing through port 60 in bushing 40, groove 59 and aperture 61 to oil pocket 62 from which it is adapted to overflow into the crank case chamber 9 and thence back to oil reservoir 3.

The pumping stroke of the lubricant piston is completed substantially at the lower dead center position of crank arm 38 in which position the groove 53 moves out of registry with passage 52 in the connecting rod to thereby prevent back flow of oil previously displaced by said piston, into chamber 46 upon the subsequent intake stroke of said piston.

It will be noted that port 47 connecting the chamber 46 to the oil reservoir 3 is always open, and it is of such size as to insure filling of the chamber 46 with oil from reservoir 3 upon the intake stroke of piston 45. A portion of the oil thus drawn into this chamber on the intake stroke of piston 45 will obviously flow back to the reservoir 3 on the pumping stroke of the piston, but at the usual speed of operation of compressors of this type, a certain portion of the oil drawn into said chamber will be forced upon the pumping stroke of the piston to the connecting rod and crank shaft bearings before the direction of flow of oil entering said chamber can be reversed to permit escape thereof back to the oil reservoir. This system will thus ensure adequate lubrication of the connecting rod and crank shaft bearings even though there is no check valve, as in conventional structures, to prevent back flow of oil from chamber 46 to oil reservoir 3.

During operation of the compressor a certain amount of oil will be thrown out of the bearings at the opposite ends of the connecting rod 36 and also at the inner end of the bearing for the crank shaft 39 whereby a lubricant mist will be created in the crank case chamber 9 to provide lubrication for the bearing of the piston rod 16 in the boss 17. A certain amount of lubricant provided at this bearing may pass through to the recess 66 but any lubricant which may collect in this recess will promptly drain back into the crank case through port 68. Also lubricant will collect in the oil pocket 62 provided in the bearing member 41 above the crank shaft due to this mist as well as to the operation of piston 45 as above described. The only purpose of this pocket, however, is to hold a supply of lubricant on the bearing of the crank shaft 39 when the compressor is not operating so as to provide for prompt lubrication thereof whenever the compressor is started and prior to obtaining lubricant from the force feed system above described.

It will be noted that no oil is supplied to the wall of bushing 13 against which the piston ring 32 rubs. Friction at this point is however minimized by the self-lubricating qualities of the bushing itself obtained by the provision of fixed lubricant in the bushing. By thus keeping free oil out of contact with the bushing 13 and piston 15 no oil will become mixed with the air which is compressed by the piston, which is a very desirable characteristic.

From the above description it will be apparent that the improved compressor comprises a minimum of parts requiring very little and very simple machine work, and the initial assembly of these parts as well as replacement of parts in case of wear thereof may be accomplished quickly and easily with the simplest of tools. The compressor is designed to provide long trouble free operation and throughout its life will provide oil free compressed air.

While one illustrative embodiment of the invention has been described in detail, it is not the intention to limit the scope to that embodiment or otherwise than by the terms of the appended claims.

Having now described my invention, what I claim as new and desire to secure by Letters Patent, is:

1. In a fluid compressor, in combination, a casing having a piston bore, a fluid displacement piston mounted to reciprocate in said bore, a piston rod for operating said piston and rigidly secured thereto, said rod being slidably mounted in a bearing in said casing, a rotatable crank shaft, a member associated with said casing providing a bearing for said crank shaft, a crank arm on said crank shaft disposed adjacent one side of said piston rod between said piston and said bearing for said rod in said casing, and a connecting rod having one end journaled on said crank arm and having at the opposite end a rockable connection with said piston rod between said piston and bearing for reciprocating said rod and piston upon rotation of said crank shaft.

2. In a fluid compressor, in combination, a casing having a piston bore, a fluid displacement piston mounted to reciprocate in said bore, a piston rod for operating said piston and rigidly secured thereto, said rod being slidably mounted in two spaced bearings in said casing, a rotatable crank shaft journaled in said casing, a crank arm on said crank shaft disposed adjacent one side of said piston rod and rotatable between planes including the adjacent ends of the bearings of said piston rod, and a connecting rod having one end journaled on said crank arm and having at the opposite end a rockable connection with said piston rod between said bearings for reciprocating said piston rod and piston upon rotation of said crank shaft.

3. In a fluid compressor, in combination, a casing, a fluid displacement piston mounted to reciprocate in said casing, a piston rod for operating said piston and rigidly secured thereto and slidably mounted in two bearings spaced from each other in said casing, said piston rod having in one side thereof and between said bearings a cavity, a wrist pin carried by said piston rod adjacent one end of and extending into said cavity, a rotatable crank shaft journaled in said casing and having at one end a crank arm disposed in operative relation with said wrist pin and adapted upon rotation of said crank shaft to pass through said cavity, and a connecting rod in said cavity journaled at one end on said wrist pin and at the opposite end on said crank arm for reciprocating said piston upon rotation of said crank shaft.

4. In a fluid compressor, in combination, a crank case, a cylinder member removably secured to said crank case and having a cylinder bore, a fluid displacement piston in said bore, a piston rod for operating said piston rigidly secured thereto and extending into said crank case and slidably mounted in spaced bearings associated wth said crank case, said rod being of uniform diameter throughout its length and adapted to be removed from said bearings upon end-wise movement of said rod in one direction, said rod between said bearings having a cavity in one side thereof, a wrist pin carried by said piston rod and extending into said cavity adjacent one end thereof, a rotatable crank shaft having a crank arm disposed in operating alignment with said wrist pin and adapted to operate through said cavity, a bearing member carrying said crank shaft and having a sliding fit in an opening in said crank case and removably secured to said crank case, and a connecting rod within said cavity and having one end slidably mounted on said wrist pin and the opposite end slidably mounted on said crank arm and adapted upon rotation of said crank shaft to reciprocate said piston rod and piston, said crank arm and connecting rod being movable out of said cavity upon removal of said bearing member from said casing to provide for removal of said piston and piston rod from said crank case.

5. In a fluid compressor, in combination, a crank case, a cylinder member removably secured to said crank case and having a cylinder bore, a fluid displacement piston in said bore, a piston rod for operating said piston rigidly secured thereto and extending into said crank case and slidably mounted in spaced bearings associated with said crank case, said rod between said bearings having a cavity in one side thereof, a wrist pin carried by said piston rod and extending into said cavity adjacent one end thereof, a rotatable crank shaft having a crank arm adapted to operate through said cavity in operating alignment with said wrist pin, a bearing member carrying said crank shaft having a sliding fit in an opening in said crank case and rigidly secured to said crank case, and a connecting rod having one end slidably mounted over said wrist pin to a working position within said cavity, and having at the opposite end a journal connection with said crank arm and operative to effect reciprocation of said piston rod upon rotation of said crank shaft, said crank arm having a slip fit with said connecting rod and being slidable therein to its working position through said opening in said crank case prior to securing said bearing member to said crank case.

6. In a fluid compressor, in combination, a crank case, a cylinder member associated with said crank case and having a piston bore, a fluid displacement piston in said bore, a piston rod rigidly secured to said piston and extending into said crank case, a wall separating the interior of said crank case from said bore and providing a bearing for said piston rod through which said rod is adapted to reciprocate, a crank shaft carried by said crank case, a crank arm on said crank shaft and a connecting rod connecting said crank arm to said piston rod for effecting reciprocation of said piston in said bore upon rotation of said crank shaft, pump means operative upon rotation of said crank shaft to supply lubricant to the bearings of said crank shaft and connecting rod for effecting lubrication thereof, and means arranged to collect oil passing said piston rod through said bore and for returning same to said crank case.

7. In a fluid compressor, in combination, a crank case, a cylinder member removably secured to one end of said crank case and having a piston bore, fluid displacement piston means slidably mounted in said bore, the bearing for said piston means in said cylinder member providing lubrication for said piston means, a rod for operating said piston means and rigidly secured thereto, said crank case having a wall separating the interior thereof from said piston bore and providing a bearing in which said rod is slidably mounted, means providing a bearing for the end of said rod opposite said piston, a crank shaft extending through one side of said crank case, a bearing member associated with said crank case supporting said crank shaft, a wrist pin in said piston rod, said crank shaft having a crank arm disposed in operative relation to said wrist pin, a connecting rod rockably mounted at one end on said wrist pin and journaled at the opposite end of said crank arm providing a driving connection between said crank shaft and piston rod and piston means, the end of said piston rod opposite said piston means and its bearing constituting a lubricant displacement pump, said piston rod, wrist pin, connecting rod and crank shaft being provided with passages connected to said pump for conveying liquid displaced by said pump to the bearings of said connecting rod and crank shaft.

8. In a fluid compressor, in combination, a crank case having a chamber open at one end to a lubricant carrying reservoir, a cylinder member removably secured to the opposite end of said crank case and having a piston bore, a fluid displacement piston means slidably mounted in said bore, said crank case having a wall separating said chamber from said bore, a rod rigidly secured to said piston means and extending through a bearing therefore in said wall into said chamber, means in said reservoir having a bore in which the end of said rod opposite said piston is slidably mounted, a wrist pin carried by said piston rod in said chamber, a crank shaft extending into said chamber and having a crank arm disposed in operating alignment with said wrist pin, a bearing member for said crank shaft removably secured to said crank case, a connecting rod having one end journaled on said wrist pin and the opposite end journaled on said crank arm and operative upon rotation of said crank shaft to effect reciprocation of said piston rod and piston means, the bearing means in said reservoir for the end of said piston rod constituting a cylinder and the end of said rod constituting the piston of a lubricant displacement pump, said cylinder being always open to said reservoir for supplying lubricant to said cylinder, said piston rod, wrist pin, connecting rod and crank shaft having passages which cooperate to provide a communication for conveying lubricant displaced by said lubricant pump to the bearings of said connecting rod and crank shaft, and means operating upon the intake stroke of said lubricant pump piston to hold lubricant displaced into said communication from flowing back to said cylinder.

9. In a fluid compressor, in combination, a crank case having a chamber open at one end to a lubricant carrying reservoir, a cylinder member removably secured to the opposite end of said crank case and having a piston bore, a fluid displacement piston means slidably mounted in said bore, said crank case having a wall separating said chamber from said bore, a rod rigidly secured to said piston means and extending through a bearing therefore in said wall into said chamber, means in said reservoir having a bore in which the end of said rod opposite said piston is slidably mounted, a wrist pin carried by said piston rod in said chamber, a crank shaft extending into said chamber and having a crank arm disposed in operating alignment with said wrist pin, a bearing member for said crank shaft removably secured to said crank case, a connecting rod having one end journaled on said wrist pin and the opposite end journaled on said crank arm and operative upon rotation of said crank shaft to effect reciprocation of said piston rod and piston means, the bearing means in said reservoir for the end of said piston rod constituting a cylinder and the end of said rod constituting the piston of a lubricant displacement pump, said piston rod, wrist pin, connecting rod and crank shaft having passages which cooperate to provide a lubricant conveying communication connecting the bearings of said connecting rod on said wrist pin and crank arm and the bearing for said crank shaft serially in the order named, the end of the communication at the wrist pin being connected to the oil pump to receive oil displaced thereby and the other end of said communication being open to said reservoir.

10. In a fluid compressor, in combination, a crank case having a chamber open at one end to a lubricant carrying reservoir, a cylinder member removably secured to the opposite end of said crank case and having a piston bore, a fluid displacement piston means slidably mounted in said bore, said crank case having a wall separating said chamber from said bore, a rod rigidly secured to said piston means and extending through a bearing therefore in said wall into said chamber, means in said reservoir having a bore in which the end of said rod opposite said piston is slidably mounted, a wrist pin carried by said piston rod in said chamber, a crank shaft extending into said chamber and having a crank arm disposed in operating alignment with said wrist pin, a bearing member for said crank shaft removably secured to said crank case, a connecting rod having one end journaled on said wrist pin and the opposite end journaled on said crank arm and operative upon rotation of said crank shaft to effect reciprocation of said piston rod and piston means, the bearing means in said reservoir for the end of said piston rod constituting a cylinder and the end of said rod constituting the piston of a lubricant displacement pump, said piston rod, wrist pin, connecting rod and crank shaft having passages which cooperate to provide a lubricant conveying communication connecting the bearings of said connecting rod on said wrist pin and crank arm and the bearing for said crank shaft serially in the order named, the end of the communication at the wrist pin being connected to the oil pump to receive oil displaced thereby and the other end of said communication being open to a pocket provided above the crank shaft bearing for holding a quantity of oil supplied through said communication, said pocket being open to said reservoir whereby overflow from said pocket is returned to said reservoir.

11. In a fluid compressor, in combination, a crank case having a chamber open at one end to a lubricant carrying reservoir, a cylinder member removably secured to the opposite end of said crank case and having a piston bore, a fluid displacement piston means slidably mounted in said bore, said crank case having a wall separating said chamber from said bore, a rod rigidly secured to said piston means and extending through a bearing therefore in said wall into said chamber, means in said reservoir having a bore in which the end of said rod opposite said piston is slidably mounted, a wrist pin carried by said piston rod in said chamber, a crank shaft extending into said chamber and having a crank arm disposed in operating alignment with said wrist pin, a bearing member for said crank shaft removably secured to said crank case, a connecting rod having one end journaled on said wrist pin and the opposite end journaled on said crank arm and operative upon rotation of said crank shaft to effect reciprocation of said piston rod and piston means, the bearing means in said reservoir for the end of said piston rod constituting a cylinder and the end of said rod constituting the piston of a lubricant displacement pump, said cylinder being always open to said reservoir for supplying lubricant to said cylinder, said piston rod, wrist pin, connecting rod and crank shaft having passages which cooperate to provide a communication for conveying lubricant displaced by said lubricant pump to the bearings of said connecting rod and crank shaft, said crank shaft controlling said communication and being arranged to close said communication upon the intake stroke of said lubricant pump piston and to open said communication upon the pumping stroke of the lubricant pump piston.

12. In a fluid compressor, in combination, a crank case having a chamber open at one end to a lubricant carrying reservoir, a cylinder member removably secured to the opposite end of said crank case and having a piston bore, a fluid displacement piston means slidably mounted in said bore, said crank case having a wall separating said chamber from said bore, a rod rigidly secured to said piston means and extending through a bearing therefore in said wall into said chamber, means in said reservoir having a bore in which the end of said rod opposite said piston is slidably mounted, a wrist pin carried by said piston rod in said chamber, a crank shaft extending into said chamber and having a crank arm disposed in operating alignment with said wrist pin, a bearing member for said crank shaft removably secured to said crank case, a connecting rod having one end journaled on said wrist pin and the opposite end journaled on said crank arm and operative upon rotation of said crank shaft to effect reciprocation of said piston rod and piston means, the bearing means in said reservoir for the end of said piston rod constituting a cylinder and the end of said rod constituting the piston of a lubricant displacement pump, said piston rod, wrist pin, connecting rod and crank shaft having passages which cooperate to provide a communication for conveying lubricant displaced by said pump to the bearings of said connecting rod and crank shaft, said oil conveying communication including an arcuate slot in the crank arm bearing with said connecting rod, said slot being so arranged that upon rotation of the crank shaft said oil conveying communication will be closed upon the intake stroke of the lubricating pump piston and opened upon the pumping stroke.

13. In a fluid compressor, in combination, a crank case having a vertically arranged chamber open at its lower end to an oil reservoir, a cylinder member removably secured to the top of said crank case, a bushing in said cylinder member having a piston bore, a fluid displacement piston means slidably mounted in said bore, said crank case having a wall separating the chamber therein from said bore, a piston rod rigidly secured to said piston means and extending through said wall into said chamber, said wall having a bearing through which said rod slidably extends, a boss in said reservoir having a cylinder bore in which the end of said rod opposite said piston means is slidably mounted, a wrist pin in said chamber projecting from said piston rod, a crank shaft having a crank arm disposed in said chamber in operating alignment with said wrist pin, a bearing member for said crank shaft removably secured to said crank case over an opening therein, a connecting rod having one end journaled on said wrist pin and the opposite end journaled on the said crank arm and operative upon rotation of said crank shaft to effect reciprocation of said rod and piston means, the bore in the boss in said reservoir and the end of the piston rod slidably mounted therein constituting a cylinder and piston respectively of a lubricant displacement pump, for pumping lubricant from said reservoir, and a communication connecting said pump cylinder through said lubricant pump, piston, wrist pin, connecting rod and crank shaft to the bearings of said connecting rod and crank shaft for conveying lubricant displaced by the lubricant pump piston to said bearings, a rib extending from said wall into the bore in said bushing and providing an annular recess around said piston rod for collecting lubricant leaking through the bearing of said piston rod in said wall, and a drain connecting said recess to said crank case for draining collected lubricant back to said reservoir.

14. In a fluid compressor, in combination, a crank case having a chamber, a lubricant reservoir associated with said crank case, a cylinder head secured to said crank case, a bushing in said cylinder head having a piston bore and provided with lubricant for lubricating said bore, reciprocatory piston means slidably mounted in said bore and having at the crank case side an intake chamber open to the atmosphere and at the opposite side a compression chamber and operative upon an intake stroke to draw air from the atmosphere through said intake chamber to said compressor chamber and upon a compression stroke to discharge air under pressure from said compression chamber to an outlet, a piston rod rigidly secured to said piston means and extending through said intake chamber into the crank case chamber, said crank case having a wall separating said intake chamber from the crank case chamber and providing a bearing in which said rod is mounted to slide, a crank shaft carried by said crank case and having a crank arm disposed in said crank case chamber, a wrist pin in said crank case chamber secured in said piston rod, a connecting rod connecting said crank arm to said wrist pin whereby rotation of said crank shaft is operative to effect reciprocation of said piston means, the end of said piston rod opposite said piston means constituting a piston of a lubricant pump arranged to operate upon reciprocation of said piston means to draw oil from said lubricant reservoir and to discharge same into an outlet passage, said wrist pin, connecting rod and crank shaft having cooperating passages for conveying oil discharged to said outlet passage to the bearings of said wrist pin, crank arm and crank shaft for lubricating same, an annular rib extending from said wall into said intake chamber providing an oil receiving recess around said piston rod for collecting oil carried by said rod through the bearing in said wall, a drain connecting said recess to the crank case for draining oil from said recess, the atmospheric connection to said intake chamber and said annular rib being so arranged relative to each other that oil collecting in said recess is out of the path of flow of air through said inlet chamber.

15. A fluid compressor comprising a casing having an oil carrying reservoir, a fluid displacement piston in said casing, a crank shaft rotatably mounted in a bearing in said casing, said crank shaft having a crank arm, a wrist pin associated with said piston, a connecting rod having a rockable connection with said wrist pin and a journal connection with said crank arm and operative upon rotation of said crank shaft to effect reciprocation of said piston, said connecting rod and crank shaft having passages arranged to cooperate to provide a communication for conveying oil serially through the connecting rod bearings at said wrist pin and crank arm and through the bearing for said crank shaft, a lubricant pump for pumping oil from said reservoir into one end of said communication, the other end of which is always open to said reservoir, and means operative upon rotation of said crank shaft to actuate said lubricant pump.

16. A pump for displacing liquid comprising a cylinder having an always open inlet communication with a source of liquid, a reciprocatory piston slidably mounted in said cylinder and operative upon movement in said cylinder in one direction to draw liquid from said source through said inlet communication into said chamber and upon movement in the opposite direction to discharge liquid from said cylinder to an outlet communication, means for effecting reciprocation of said piston, and means operative to prevent flow of liquid from said outlet communication to said cylinder.

17. A pump for displacing liquid comprising a cylinder having an always open inlet communication with a source of liquid, a reciprocatory piston slidably mounted in said cylinder and operative upon movement in said cylinder in one direction to draw liquid from said source through said inlet communication into said chamber and upon movement in the opposite direction to discharge liquid from said cylinder to an outlet communication, a crank shaft, a crank arm on said crank shaft, a connecting rod connected to said piston and having a journal connection with said crank arm for effecting reciprocation of said piston upon rotation of said crank shaft, said outlet communication including a passage through said connecting rod, a passage in said crank arm and an arcuate groove in said bearing arranged to establish communication between said passages upon movement of said piston in the direction to discharge liquid from said cylinder and to close such communication upon movement of said piston in the opposite direction.

18. In a fluid compressor, in combination, a casing having a piston bore, a fluid displacement piston mounted to reciprocate in said bore, a piston rod for operating said piston and rigidly secured thereto, said rod being slidably mounted in two spaced bearings in said casing, a crank shaft, a crank arm on one end of said crank shaft disposed to turn between planes including the adjacent ends of said bearings, a wrist pin secured at one end to said rod between said bearings and projecting from said rod into operating alignment with said crank arm, a connecting rod having one end slidably mounted over said wrist pin and the opposite end slidably mounted over said crank arm and operative upon rotation of said crank shaft to reciprocate said rod and piston, and a bearing member carrying said crank shaft and removably secured to said casing, said connecting rod being held in place by said rod on one side and said crank arm on the opposite side.

19. In a fluid compressor, in combination, a crank case, a cylinder member removably secured to said crank case and having a cylinder bore, a fluid displacement piston in said bore, a piston rod for operating said piston rigidly secured thereto and extending into said crank case and slidably mounted in spaced bearings associated with said crank case, said rod between said bearings having a cavity in one side thereof extending substantially to the longitudinal axis of said rod, a crank shaft extending into said casing through an opening therein, eccentric means in said cavity connecting said rod to said crank shaft and operative upon rotation of said crank shaft to effect reciprocation of said rod and piston, and a bearing member carrying said crank shaft and removably secured to said casing, the connections between said eccentric means and crank shaft and rod providing for the sliding of said crank shaft relative to said eccentric means out of driving contact therewith and removal of said crank shaft through said opening, and the sliding of said eccentric means out of driving contact with said rod and removal thereof through said opening to thereby provide for longitudinal movement of said rod out of said bearings upon removal of said cylinder member from said casing.

20. In a fluid compressor, in combination, a crank case having a bearing bore at one end, a coaxially aligned bearing bore at the opposite end of said crank case, a cylinder member removably secured to one end of said case and having a piston bore in coaxial alignment with said bearing bores, a piston in said piston bore, a piston rod rigidly secured centrally to one side of said piston and extending through and having sliding contact with said bearing bores, a crank shaft extending into said casing through an opening therein, a crank arm at one end of said crank shaft disposed adjacent one side of said rod and adapted to turn between planes including the adjacent ends of said bearing bores, eccentric means connecting said rod to said crank arm and operative to effect reciprocation of said rod and piston upon rotation of said crank shaft, and a bearing member carrying said crank shaft and removably secured to said casing; the connections between said eccentric means and crank shaft and rod providing for sliding of said eccentric means and crank shaft relative to each other and away from said rod to provide for application and removal thereof through said opening and to thereby free said rod for application to or removal from said bearing bores.

21. In a fluid compressor, in combination, a casing having a piston bore, a fluid displacement piston mounted to reciprocate in said bore, a piston rod for operating said piston and rigidly secured thereto, said rod being slidably mounted in a bearing in said casing, a rotatable crank shaft, a member associated with said casing providing a bearing for said crank shaft, a crank arm on said crank shaft disposed adjacent one side of said piston rod between said piston and said bearing for said rod in said casing, and a connecting rod having one end journaled on said crank arm and having at the opposite end a rackable connection with said piston rod between said crank arm and bearing for reciprocating said rod and piston upon rotation of said crank shaft.

22. In a fluid compressor, in combination, a casing having a piston bore, a fluid displacement piston mounted to reciprocate in said bore, a piston rod for operating said piston and rigidly secured thereto, said rod being slidably mounted in two spaced bearings in said casing, one of said bearings being adjacent the end of said rod most remote from said piston and the other bearing being intermediate the ends of said rod, a rotatable crank shaft journaled in said casing adjacent the said other bearing, a crank arm on said crank shaft disposed adjacent one side of said piston rod and rotatable between planes including the adjacent ends of the bearings of said piston rod, and a connecting rod having one end journaled on said crank arm and having at the opposite end a rockable connection with said piston rod adjacent the said one bearing for reciprocating said piston rod and piston upon rotation of said crank shaft.

BURTON S. AIKMAN.